United States Patent [19]
Malone, Jr.

[11] Patent Number: 6,007,279
[45] Date of Patent: Dec. 28, 1999

[54] CHIPPER-TOOTHED HOLE SAW

[76] Inventor: John M. Malone, Jr., 4219 Gilliat St., Duluth, Minn. 55804

[21] Appl. No.: 08/833,589

[22] Filed: Apr. 7, 1997

[51] Int. Cl.⁶ .................................................... B23B 27/10
[52] U.S. Cl. ......................... 408/204; 144/150; 144/219; 408/206
[58] Field of Search ................................... 144/218, 219, 144/150; 408/203, 204, 206, 207; 30/300, 310; 83/840, 841, 842, 843

[56] References Cited

U.S. PATENT DOCUMENTS

| | | |
|---|---|---|
| 91,225 | 6/1869 | Gibson . |
| 448,126 | 3/1891 | Craig . |
| 467,383 | 1/1892 | Roberts . |
| 1,620,255 | 3/1927 | Hall . |
| 2,573,462 | 10/1951 | Lindsey . |
| 2,755,827 | 7/1956 | Gerding ............................. 144/150 X |
| 3,610,768 | 10/1971 | Cochran .................................. 144/219 |
| 3,825,362 | 7/1974 | Hougen . |
| 3,938,249 | 2/1976 | Chacon ..................................... 30/300 |
| 4,539,750 | 9/1985 | Jarvi et al. .............................. 408/204 |
| 4,616,965 | 10/1986 | Anderson et al. ....................... 408/204 |
| 4,952,102 | 8/1990 | Hougen . |
| 5,451,128 | 9/1995 | Hattersley . |

*Primary Examiner*—W. Donald Gray
*Attorney, Agent, or Firm*—Douglas J. Christensen

[57] ABSTRACT

A hole-cutting device for attachment to a portable electric drill or similar rotating machine. The device has a cylindrical body with a rearward edge and a forward edge; a mounting plate is affixed across the rearward edge, and a series of chipper teeth are affixed about the forward edge. Each chipper tooth has a transverse cutting edge and a second cutting edge in substantial alignment with the wall of the cylinder, but alternate chipper teeth have second cutting edges displaced inwardly and outwardly from the cylindrical member.

11 Claims, 3 Drawing Sheets

CHIPPER-TOOTHED HOLE SAW

BACKGROUND OF THE INVENTION

The present invention relates generally to a hole-saw device for cutting holes in wood material; more particularly, the invention relates to a hole saw having chipper teeth for facilitating the cutting operation.

Hole-cutting saw devices are well known in the art, the most typical prior art device being one which merely constrains a saw-toothed blade in a circular loop. The tooth pattern of such devices usually adapts conventional saw-toothed techniques to provide a series of sharpened metal points aligned around a circular path wherein each toothed point may be aligned slightly outwardly or inwardly from the vertical in order to widen the cutting pattern. A widened cutting pattern offers the advantage of cutting a circular groove which is wider than the thickness of the cutting blade, and therefore it eases the frictional forces of the wood against the side surfaces of the blade. The cutting effectiveness of such a device depends upon the force applied against the cutting tool so that the sharpened saw blade points are forced to bite into the wood material and thereby to remove particles of material. If no axial force is applied against the cutting tool, devices of this type will generally merely turn in the saw groove without removing material from the bottom of the saw groove.

The foregoing operation of conventional hole-cutting saws is to be contrasted with the operation of other cutting tools, such as chain saws. The chain saw cutting tool utilizes a series of aligned links which are propelled in an endless loop via a chain drive mechanism but always along a linear cutting path. Each link comprises a small wood chipper wherein the link has a forward gauge plate to restrain the depth of chipping and cutting, followed by a rearward curved and sharpened blade edge which is positioned at an elevation higher than the gauge member. The elevation distance between the sharpened blade edge and the gauge member determines and limits the depth of chipping; i.e., the chipper blade's natural propensity to bite deeply into the wood surface is limited by the gauge which rides along the bottom of the groove just ahead of the chipper cutting edge. Chain saws utilize this principle to rapidly and efficiently cut through wood materials, principally trees; and if each of the chipper teeth are well sharpened, there is no external force required to facilitate the cutting operation. The weight of the chain saw blade and guide bar by itself, together with the natural propensity of the chipper to dig into the wood material, enables the chain saw to guide itself through a cut in a wood material.

Because a certain axial force is required to drive a hole cutting saw through wooden materials, it becomes increasingly difficult to cut holes of increasing diameter. In the construction trades, particularly the plumbing and heating/ventilating trade, it frequently becomes necessary to cut enlarged holes for the passage of pipes and heating ducts. Such hole saws as required for these operations may be required to cut up to six-inch diameter holes; the axial force and torque required against the cutting tool for a six-inch diameter hole is quite large and may be beyond the capabilities of some workmen and power drills. It, therefore, would be a significant advantage to provide a hole-cutting device which operates with substantially lowered axial force in order to complete a cutting operation.

SUMMARY OF THE INVENTION

This invention relates to a hole-cutting device utilizing a plurality of aligned chipper teeth along an edge of a cylindrical carrier. The chipper teeth are preferably removably attachable along the forward cylindrical carrier edge, although one embodiment of the invention utilizes a cylindrical carrier and aligned chipper teeth made from a single stamping. The chipper teeth are each characterized by a forwardly positioned depth gauge and a rearward cutting edge, wherein the cutting edge deviates outwardly from the plane of the depth gauge, and the cutting edge includes a transverse edge which has a length significantly larger than the thickness of the depth gauge and a second cutting edge substantially aligned with the wall of the cylindrical carrier but displaced axially inwardly or outwardly from the cylindrical wall. The chipper teeth are arranged in alternating positions wherein the respective second cutting edges are alternately displaced from the plane of the cylindrical carrier inwardly and outwardly, thus providing an inner diameter and outer diameter cutting edge for creating a widened groove through the wood material. The alternating positions of the second cutting edges of the chipper teeth together with the transverse length of the first cutting edge, provides an enlarged circular cutting path which provides plenty of clearance for the cylindrical carrier to move inwardly and outwardly without binding. The rearward end of the cylindrical holder, which is opposite the chipper teeth, is provided with a connecting plate which extends across the entire diameter of the cutting tool and which provides holes and other aligned openings for attachment to a driving mechanism. This connecting plate preferably does not cover the entire cylindrical end but provides openings through the end for permitting ejection of the wood chips created by the cutting teeth. Thus, as the chips are removed during the cutting operation they are ejected and propelled rearward through the openings created in the rearward cylindrical end of the cutting device.

It is a principal object of the present invention to provide a hole-cutting tool for efficiently cutting enlarged holes through wooden materials with a minimum of axial drive force required, thereby providing a significant advantage over prior art hole-cutting devices.

It is another object and advantage of the present invention to provide a cylindrical hole-cutting device having chipper teeth which may be readily sharpened by conventional techniques on the job site.

It is a further object and advantage of the present invention to provide a hole-cutting device having teeth which may be replaced individually in the case of damage or wear of a single tooth.

Further objects and advantages of the present invention will become apparent from the following specification and claims and with reference to the appended drawings.

DESCRIPTION OF THE PREFERRED EMBODIMENT

Figure 1:
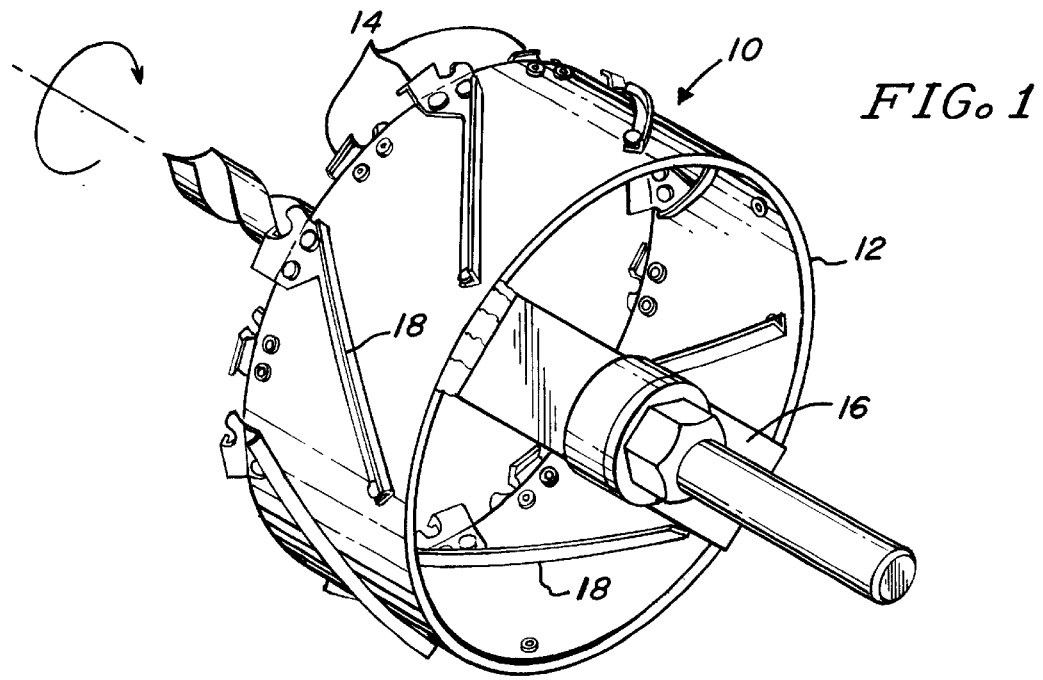
FIG. 1 shows an isometric view of a first embodiment of the invention.
Figure 2:
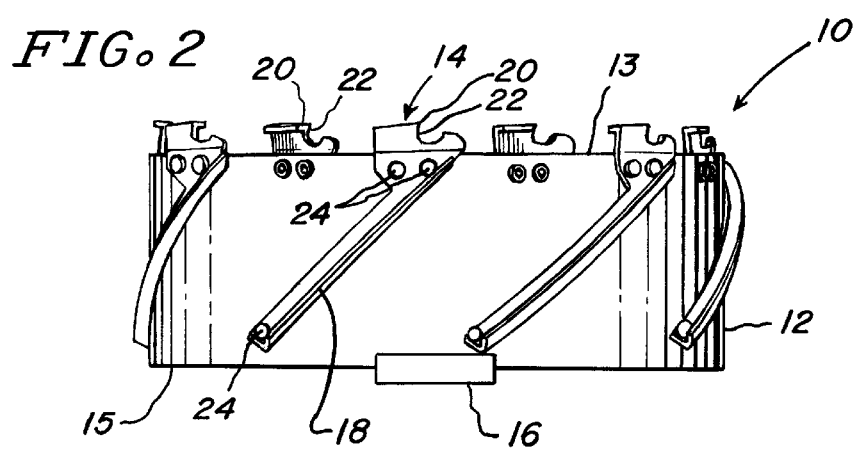
FIG. 2 shows an elevation view of the device of FIG. 1.

Referring first to FIGS. 1 and 2, a first embodiment of the invention is shown in isometric view and in elevation view. The hole-cutter 10 comprises a cylinder 12 having a forward edge 13 and a rear edge 15, with a plurality of chipper teeth 14 in spaced alignment along the forward edge 13. A connecting plate 16 is affixed across the diameter of cylinder 12 along its rearward edge 15. Each of the chipper teeth 14 has an elongate shank 18, an upper cutting edge 20, and a side cutting edge 22. Each of the chipper teeth are affixed to the cylinder 12 by three rivets 24, or equivalent fasteners. The cylinder 12 is pre-drilled with holes for the rivets 24 so as to affix each chipper tooth along an inclined angle as illustrated in the figures. The connecting plate 16 is threaded, bored or otherwise prepared for attachment to a suitable rotary driver, such as an electric portable drill. One version of this embodiment contemplates inclined grooves along the exterior and interior surfaces of cylinder 12 in order to provide a keyed slot for inserting and holding the respective chipper teeth. The chipper teeth are alternately affixed along the inner and outer surfaces of cylinder 12 so as to provide a side cutting edge 22 on the inside edge of one chipper tooth, and a side cutting edge 22 on the outside edge of the next subsequent chipper tooth and so forth.

Figure 3:
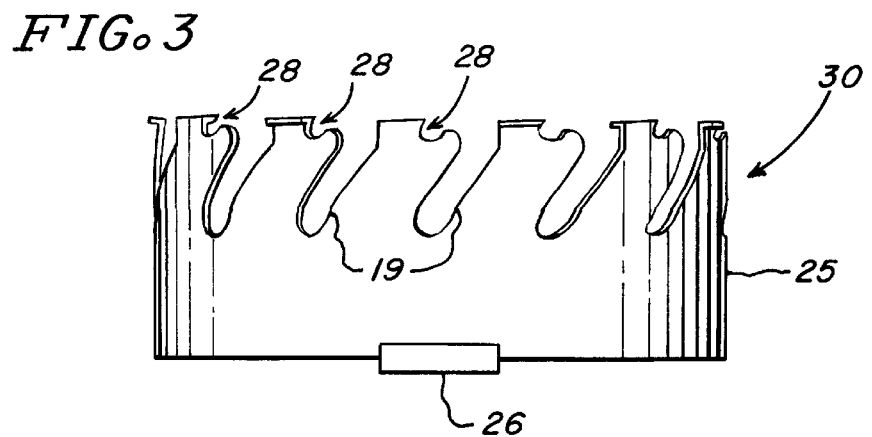
FIG. 3 shows a similar embodiment made from a stamping process.

FIG. 3 shows an alternative embodiment wherein cylinder 25 and chipper teeth 28 are made from a single metal stamping. The manufacturing process used to make the hole cutter 30 illustrated in FIG. 3 involves the stamping of a continuous metal strip to form the cylinder 25 and the chipper teeth 28 with subsequent stamping steps required for bending each of the chipper teeth into the appropriate shape. Intermediate each of the chipper teeth 28 there is found an elongate slot cutout which improves the removal of wood chips from the area of the whole cut. The chipper teeth 28 may then subsequently be sharpened for use in the field. The connecting plate 26 is subsequently affixed by welding or similar affixation process.

Figure 4:
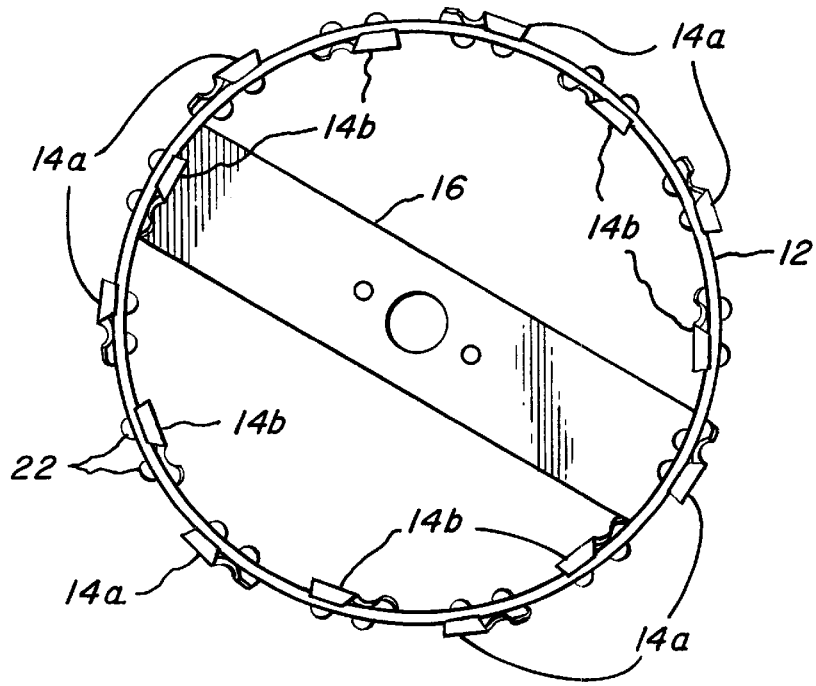
FIG. 4 shows an end view of the device of FIG. 1.

FIG. 4 illustrates an end view of the embodiments shown in FIGS. 1 and 2. This view clearly shows the alternating and staggered mounting configuration of the chipper teeth, as for example, chipper tooth 14a affixed to the exterior surface of cylinder 12 and chipper tooth 14b affixed to the interior surface of cylinder 12. Subsequent alternating chipper teeth are affixed to respective outer and inner surfaces of cylinder 12. FIG. 4 also illustrates the connecting plate 16 and representative mounting holes for affixing the hole-cutter 10 to an arbor of a hand drill.

Figure 5:
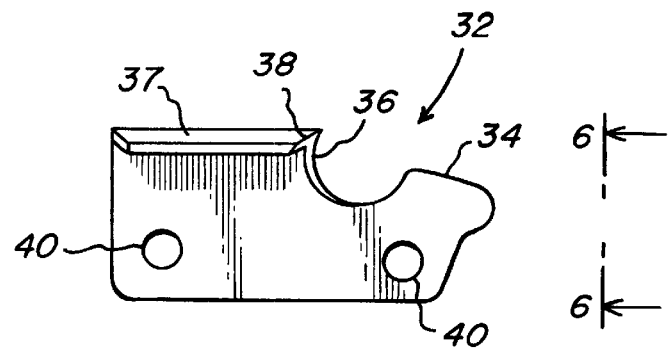
FIG. 5 shows an elevation view of a single chipper tooth.
Figure 6:
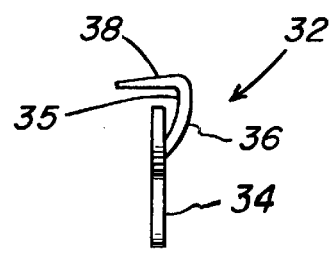
FIG. 6 shows an end view of the chipper tooth of FIG. 5.

FIGS. 5 and 6 illustrate a further embodiment of the construction of a chipper tooth 32, in side elevation view (FIG. 5) and an end view (FIG. 6) taken along the lines 6—6 of FIG. 5. A forwardly-facing depth gauge member 34 is followed by a side cutting edge 36 and a transverse cutting edge 38. Transverse cutting edge 38 is formed along the forward edge of a transverse tab 37 which is formed by bending the chipper tooth 32. The side cutting edge 36 is formed along a side surface 35 which has been outwardly bent to place the side cutting edge 36 outside the plane of depth gauge member 34. A pair of mounting holes 40 are provided for affixing the chipper tooth 32 to the side of cylinder 12. It should be noted that FIGS. 5 and 6 illustrate one form of bending which may be used to form the chipper tooth 32; another form of bending will yield a mirror image representation of the chipper tooth wherein the side cutting edge 36 is displaced inwardly from depth gauge member 34.

Figure 8:
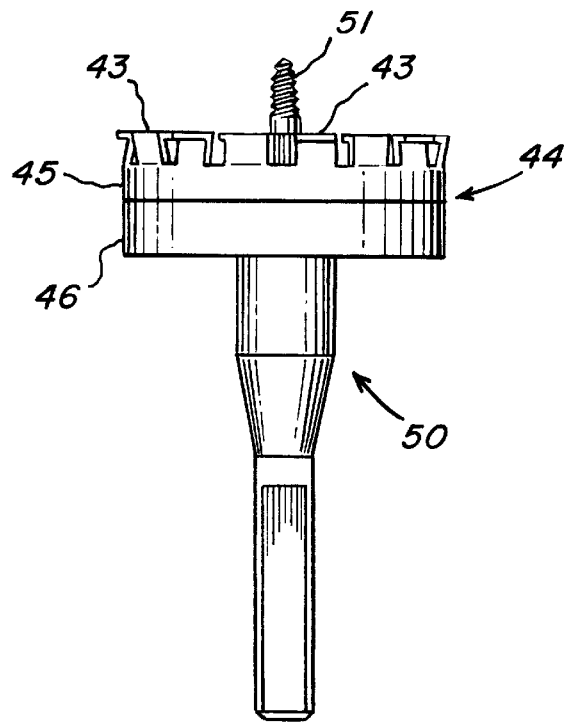
FIG. 8 shows an elevation view of the device of FIG. 7 with the chipper blade affixed to the auger.
Figure 7:
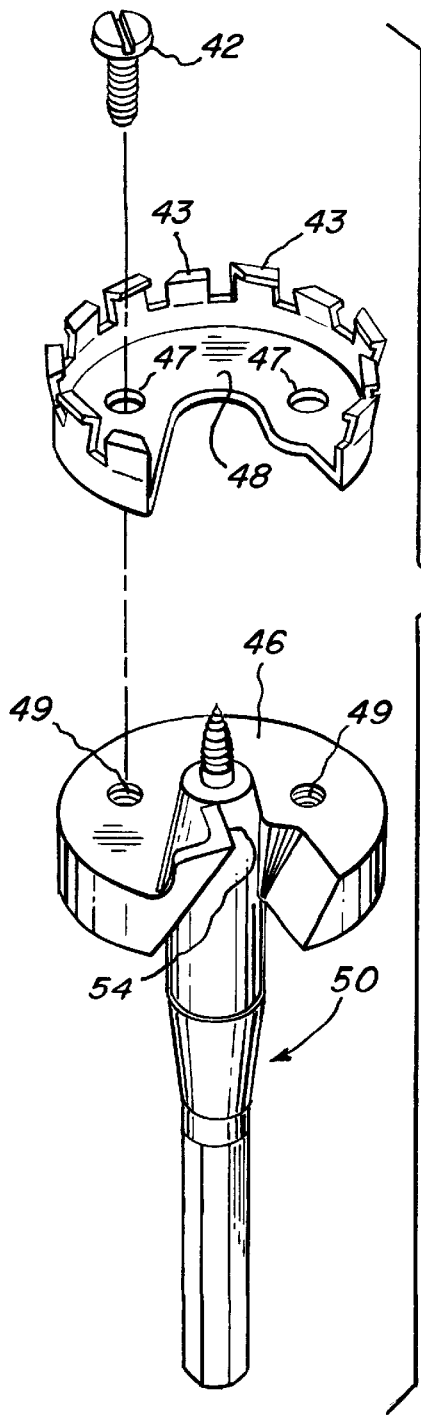
FIG. 7 shows a further embodiment of the invention adapted for attachment to an auger.
Figure 9:
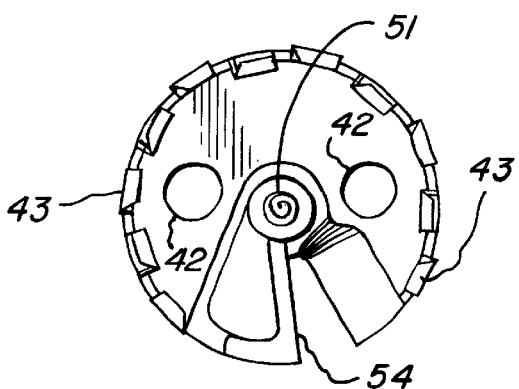
FIG. 9 shows an end view of the device of FIG. 8.

FIGS. 7, 8 and 9 illustrate yet another embodiment of the invention wherein a chipper blade 44 is affixed to the forward end 46 of an auger 50. FIG. 7 shows an exploded isometric view illustrating the alignment of pre-drilled holes 47 through a plate 48 which forms a base plate for chipper blade 44. Mating threaded holes 49 are formed into the forward end 46 of auger 50. Auger 50 has a "V"-shaped cutaway 52 and a blade cutting edge 54 as a part of its usual and representative construction. Chipper blade 44 has a semi-cylindrical side wall 45 and a plurality of forwardly-facing chipper teeth 43. The chipper teeth 43 provide an enlarged circular groove cutout to improve the operation of the auger cutting edge 54. The forwardmost cutting edges of chipper teeth 43 will carve a circular groove from the wood surface and the trailing cutting edge 54 of the auger will remove all the wood material within the circle created by the chipper teeth. A boring thread 51 may be secured into a center opening of auger 50 to assist in driving the auger into and through a wood surface, at a proper rotary speed to draw the auger 50 and chipper blade 44 into the wood. FIG. 9 illustrates an end view of the apparatus of FIGS. 7 and 8, with threaded fasteners 42 shown securing the chipper blade 44 to the front forward end of auger 50. This view also illustrates the alternating inward and outward cutting edges of the respective chipper teeth, as has hereinbefore been described.

In operation, with any of the foregoing embodiments the hole cutter of the present invention is fastened to an arbor of an electric drill or fastened to a rotating machine of equivalent type. When the rotating machine is activated, the hole cutter will systematically chip its way into and through the wood surface by engagement of the respective side cutting edges and transverse cutting edges of the chipper teeth. The depth of the cut will be limited by the gauge member, or auger screw, preventing the transverse cutting edges from removing more than a predetermined depth of material from the wood. The respective chipper teeth may be sharpened at the job site by using a powered sharpening tool such as is common with respect to chain saws. The various embodiments of the hole cutter may in fact utilize chain saw teeth in forming the hole cutter construction. If any of the teeth become damaged or excessively worn, the tooth can be removed by removing the rivets which secure it to the hole cutter cylinder and by replacing the tooth with a new one at the same location.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A hole-cutting apparatus adapted for attachment to a rotary drive machine, comprising:

a) a hollow cylindrical member having a cylindrical wall, a forward circular edge and a rearward circular edge;

b) a connecting plate affixed across the diameter of said cylindrical member at the rearward edge thereof;

c) a plurality of chipper teeth affixed at spaced intervals along said forward circular edge, each of said chipper teeth having a transverse first cutting edge relative to said forward circular edge, a second cutting edge substantially aligned with said cylindrical wall but axially offset therefrom, and a depth gauge member comprising an upstanding tab aligned with said cylindrical wall, the height of said tab being less than the height of said transverse cutting edge.

2. The apparatus of claim 1, wherein said chipper teeth are alternately affixed to the inside and outside surfaces of said cylindrical member.

3. The apparatus of claim 2, wherein each of said chipper teeth further comprise an elongate item affixed to the surface of said cylindrical member.

4. The apparatus of claim 3, wherein said cylindrical member further comprises a plurality of slots alternately arranged along the inside and outside surface of said cylinder, said slots being inclined relative to the cylinder axis, and said slots each being sized to contain the elongate stem of a chipper tooth.

5. The apparatus of claim 1, wherein said cylindrical member and said chipper teeth are formed from a single metal stamping.

6. The apparatus of claim 1, wherein said connecting plate further comprises a semicircular plate having holes for fasteners to secure said plate against an auger.

7. A hole-cutting apparatus for attachment to a rotary power tool, comprising:
   a) a thin-walled cylindrical member having a predetermined diameter and length, and having a forward and rearward circular edge;
   b) a connecting plate affixed along said rearward edge and extending across a diameter of said rearward circular edge;
   c) a plurality of chipper teeth removably affixed to said cylindrical member in relatively equal spaced-apart relationship, all of said teeth having cutting edges projecting forwardly of said forward circular edge; each said chipper teeth comprising a transverse cutting edge of a length exceeding the thickness of said thin-walled cylindrical member, said transverse cutting edge substantially positioned over said forward circular edge; each of said chipper teeth further comprising a side cutting edge in spaced position relative to said thin-walled cylindrical member, said plurality of chipper teeth being alternately aligned to provide alternate side cutting edges radially inwardly spaced and outwardly spaced from said thin-walled cylindrical member.

8. The apparatus of claim 7, wherein each chipper tooth further comprises a depth gauge tab projecting forwardly of said forward circular edge, but rearwardly of said transverse cutting edge.

9. The apparatus of claim 8, wherein each of said chipper teeth further comprises an elongate stem having means for attachment to said thin-walled cylindrical member.

10. The apparatus of claim 9, further comprising slotted grooves alternately arranged along the inner and outer walls of said thin-walled cylindrical member, said grooves sized to accept said chipper teeth elongate stems.

11. The apparatus of claim 10, wherein said grooves are inclined relative to the axis of said thin-walled cylindrical member.

* * * * *